(12) United States Patent
Unseld

(10) Patent No.: US 6,837,101 B2
(45) Date of Patent: Jan. 4, 2005

(54) APPARATUS FOR THE MEASUREMENT OF THE CHARACTERISTICS OF RUBBER TIRES, IN PARTICULAR MOTOR VEHICLE TIRES

(75) Inventor: Klaus Unseld, Hanau (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 52 days.

(21) Appl. No.: 10/267,762

(22) Filed: Oct. 9, 2002

(65) Prior Publication Data
US 2003/0066344 A1 Apr. 10, 2003

(30) Foreign Application Priority Data
Oct. 9, 2001 (DE) .................................. 201 16 545 U

(51) Int. Cl.⁷ ............................................ G01M 17/02
(52) U.S. Cl. ...................................................... 73/146
(58) Field of Search ........................... 73/11.04, 146, 73/146.2, 146.3, 117, 118.1, 121, 122, 123, 865.6; 340/438, 442, 443, 444; 701/29

(56) References Cited

U.S. PATENT DOCUMENTS

| | | | |
|---|---|---|---|
| 3,693,421 A | 9/1972 | Karper et al. ............... 73/101 |
| 3,699,808 A | * 10/1972 | Ford et al. .................... 73/772 |
| 3,871,210 A | 3/1975 | Himmler et al. ............... 73/67 |
| 6,202,496 B1 | 3/2001 | Jakob et al. .................. 73/866 |
| 6,360,593 B1 | 3/2002 | Schoenfeld ................... 73/146 |
| 2002/0134149 A1 | * 9/2002 | Shiraishi et al. ............. 73/146 |
| 2002/0166371 A1 | * 11/2002 | Ratti et al. .................... 73/146 |
| 2003/0046992 A1 | * 3/2003 | Caretta ......................... 73/146 |

FOREIGN PATENT DOCUMENTS

| | | | | |
|---|---|---|---|---|
| DE | 31 16 536 A1 | 11/1982 | .......... | G01M/17/02 |
| DE | 37 09 051 A1 | 10/1987 | .......... | G01M/17/02 |
| GB | 1 400 941 | 7/1975 | ............ | G01N/3/56 |

* cited by examiner

Primary Examiner—Eric S. McCall
(74) Attorney, Agent, or Firm—David L. King; Richard B. O'Planick

(57) ABSTRACT

An apparatus for measuring the properties of rubber elastic tires, in particular motor vehicle tires, in dependence on simulated driving loads and/or running states for the rotation of a tire to be measured at a tire contact patch and apparatus for simulating driving loads and/or running states, in particular with respect to the rotational speed, to the weight load and to the slip angle of the tire, wherein a device for measuring the visco-elastic properties of the tire is provided at the apparatus and is designed for direct use on the tire disposed in the apparatus.

20 Claims, 3 Drawing Sheets

Figure 1:
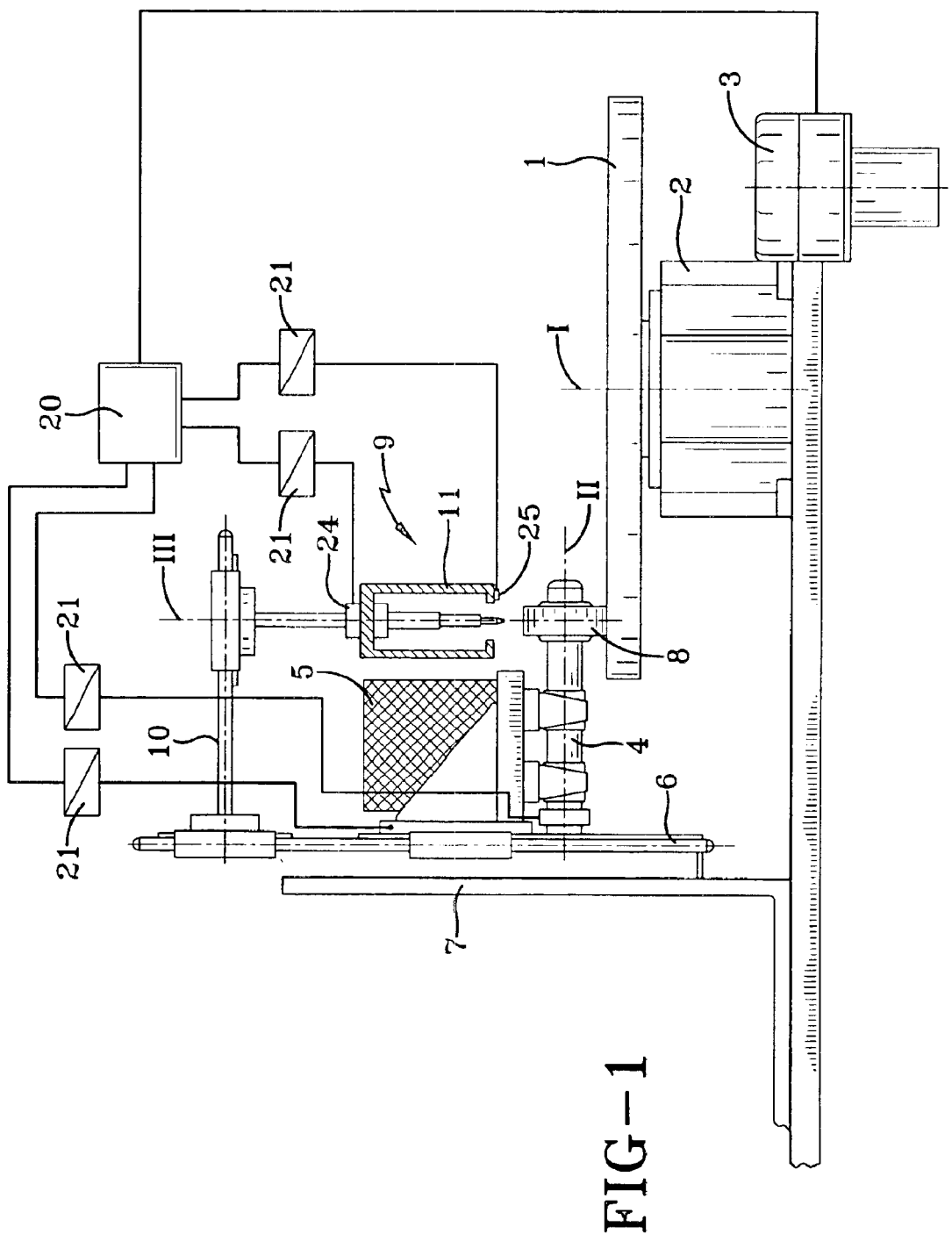

APPARATUS FOR THE MEASUREMENT OF THE CHARACTERISTICS OF RUBBER TIRES, IN PARTICULAR MOTOR VEHICLE TIRES

FIELD OF THE INVENTION

The present invention relates to an apparatus for the measurement of the characteristics of rubber elastic tires, in particular motor vehicle tires, in dependence on simulated driving loads and/or running states with means for the rolling off of a tire to be measured at a tire contact patch and means for simulating driving loads and/or running states, in particular with respect to the rotational speed, to the weight load and to the slip angle of the tire.

Such apparatuses are already known. They are used in order to determine the characteristics of tires in dependence on defined driving loads and/or load states, in particular with respect to the wearing of the tires and their high-speed strength.

PRINCIPAL OBJECT OF THE INVENTION

The invention is based on the object of improving the use of such an apparatus and expanding its scope of use.

BRIEF DESCRIPTION OF THE INVENTION

This object is satisfied in that a device for measuring the visco-elastic properties of the tire is provided at the apparatus and is designed for direct use at the tire disposed in the apparatus.

Through the provision of such a device for the measurement of the visco-elastic properties of the tire and for direct use at the tire located in the apparatus the visco-elastic properties can be measured in advantageous manner in dependence on the driving loads. It is not necessary to mount the tire on a vehicle in order to achieve the loadings. It is also not necessary to remove the tire from the apparatus and to pass it to a separate measuring device for visco-elastic properties. The cost and complexity of the measurement is thereby significantly reduced. Moreover, space is saved.

The device comprises, in accordance with one design of the invention, a measuring body which has a measuring head, which can be placed onto a tire and which is displaceably mounted relative to a holder fastened to the apparatus, means for moving the measuring body to and fro and means for measuring the displacement path of the measuring head and/or the force acting on the measuring head during the moving to and fro of the measuring body.

With such a device a dynamic hardness measurement can advantageously be effected at the tire without a sample having to be taken from the latter. On the contrary, the measurement can be effected directly at the unchanged tire present in the apparatus.

The measurement can thereby be carried out directly following a predetermined driving load or rolling off in a predetermined running state, so that particularly authentic results can be achieved. Repeated measurements can be carried out on one and the same tire, since this does not have to be destroyed for the measurement. This is particularly advantageous as a result of the combination with the means for the rolling off of the tire and means for the simulation of driving loads and/or running states by which a defined tire state can be set. The measured values which are obtained can be compared with one another particularly well.

The apparatus has, in particular, a rotatable disc on which a tire, which is to be measured, can roll off. An axle is preferably arranged above the disc onto which a tire to be measured, optionally in the form of a tire mounted on a wheel, can be brought, with the axle being rotatably journalled in an apparatus by means of which a tire can be pressed via the axle against the disc, with the orientation of the tire relative to the disc being variable. In this way, desired driving loads and load states can be set in a defined and expedient manner.

In accordance with a further embodiment of the invention, means are provided by which cyclic measurements of the visco-elastic properties and/or of temperature can be carried out at a tire. Each load phase thus alternates with a measuring phase. For this, the means are preferably so designed that measurements can in each case be carried out after a defined load time of the same length. In this way, the reliance placed on the time development is increased.

In accordance with a further embodiment of the invention, means are provided by which a comparison can be carried out of tires heated by loading with tires heated in a tempering apparatus. In this way, further advantageous pronouncements concerning tire properties can be obtained.

It is likewise preferred when means are provided by which a standing period with or without load can be introduced following one or more load phases before a further measurement takes place. It has been shown that additional pronouncements concerning tire properties can be obtained in this way.

Furthermore, means can also be provided by which a comparison can be made with the respectively occurring slip energy. In this way, additional pronouncements concerning the tire properties can be obtained with advantage.

BRIEF LISTING OF THE DRAWINGS

Figure 2:
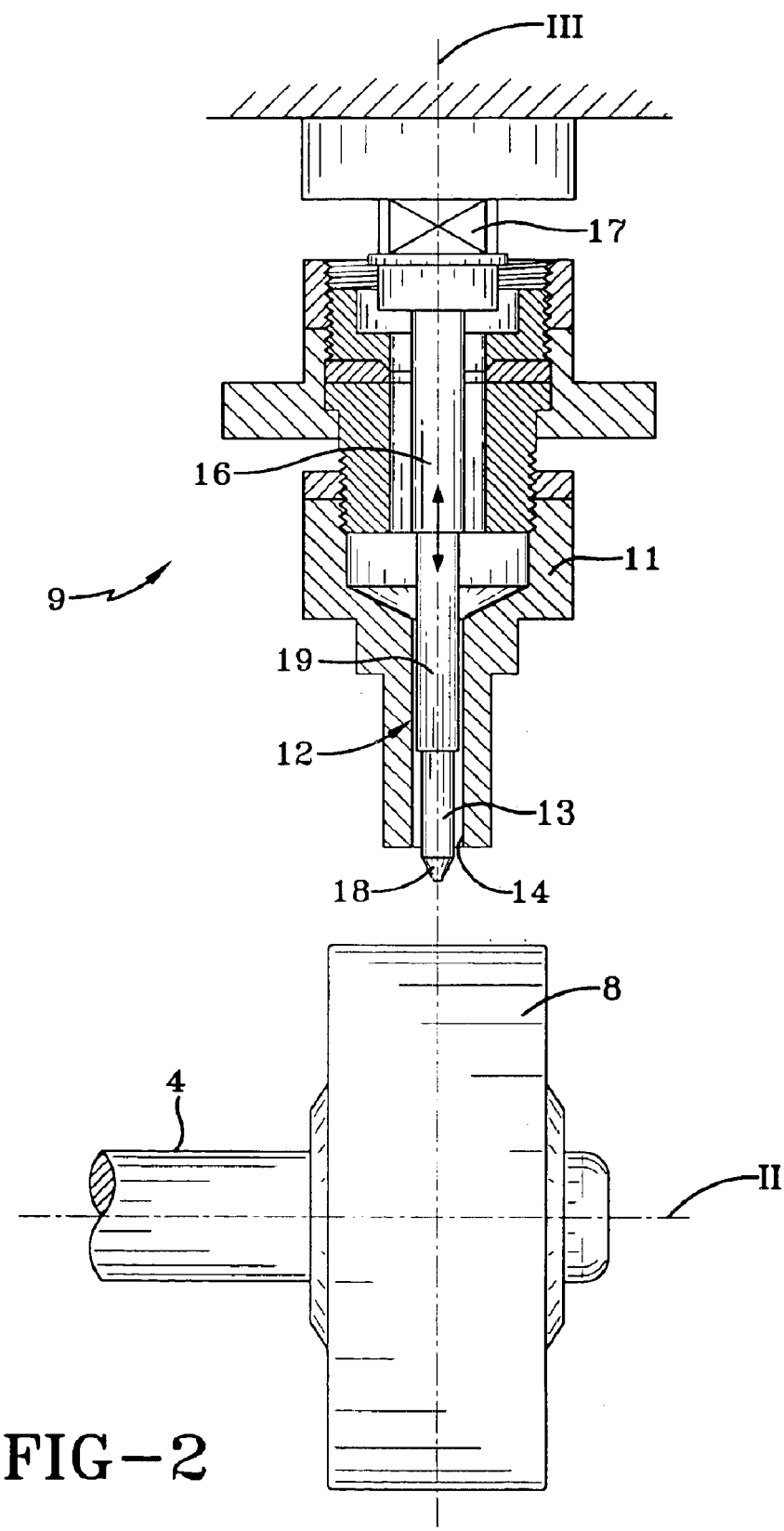

Embodiments of the invention are shown in the drawings and will be described in the following. There are shown, in each case in schematic illustration:

FIG. 1 a side view of an apparatus in accordance with the invention,

FIG. 2 a detail of the apparatus of FIG. 1 in a first state, and

Figure 3:
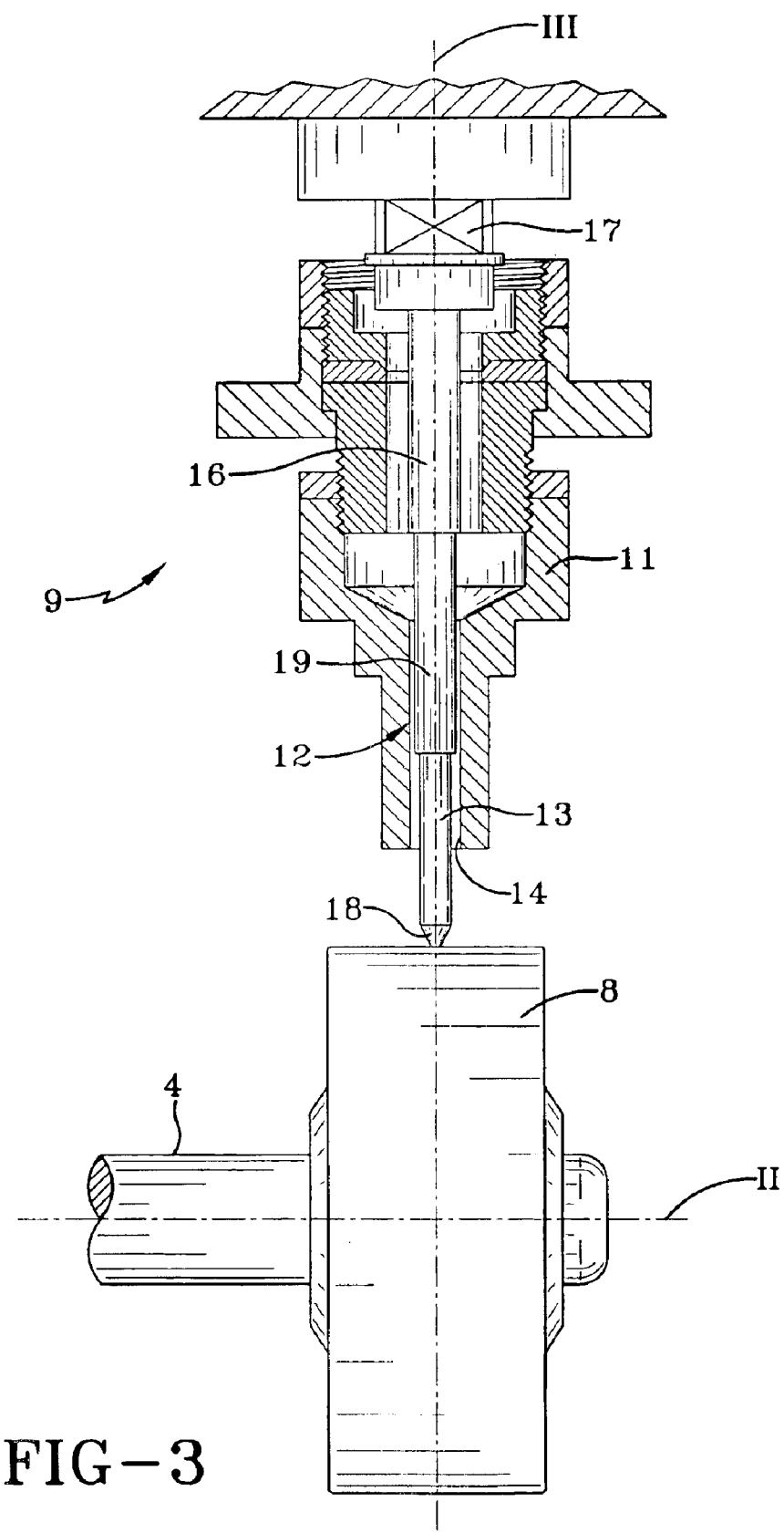

FIG. 3 the detail of FIG. 2 in a second state.

DESCRIPTION OF THE PREFERRED EMBODIMENT

The apparatus shown comprises a disc 1 which can be driven by means of a drive device 2, 3 to rotate about a vertical axis I. An axle shaft 4 is arranged laterally above the disc 1 and is rotatably journalled about its longitudinal axis II in an apparatus 5. The apparatus 5 is mounted via a frame 6 to a wall 7. It is designed for the setting of driving loads and running states of a tire 8 pushed onto the axle shaft 4, for example for pressing the tire 8 against the disc 1 and for setting an inclined running angle. Above the axle shaft 4 and laterally alongside the holding device 5 there is provided an apparatus 9 for the measurement of visco-elastic properties which is likewise mounted on the frame 6 via a boom 10. It is adjustable in height relative to the axle shaft 4 and can be fixed at the respectively set height.

In detail, the device 9 for the measurement of visco-elastic properties includes a housing 11 in which a measuring body 12 is journalled for to and fro movement along a vertical axis III. The measuring body 12 has a measuring head 13 which projects through an opening 14 at the lower side of the housing 11. The measuring body 12 with the measuring head 13 can be extended out of the housing 11 in order to enter into engagement with the tire 8. FIG. 2 shows the retracted position of the measuring body, FIG. 3 the extended position.

The measuring body comprises a piezo-element 16 formed as a stack translator which is connected with a force pick-up 17 formed by a quartz crystal, the force pick-up being in turn secured to the housing 11. The measuring head 13 of the measuring body 12 has a tip 18 formed as a Shore-A penetrating body in accordance with DIN 53505 and is connected to the lower end of the piezo-element 16 via a connection element 19.

The illustrated apparatus further comprises an evaluation and control unit 20 which is connected via measurement converters 21 to the various measurement sensors and also to the drive 2, 3. Sensors for the loading of the tire 8, for its inclined running angle, cumber angle or slip angle, for its temperature and for the force transmitted from the measurement body 12 and/or the path traveled by it are in particular provided. In this manner, the measurement data obtained via the measurement converters 21 can be evaluated in the unit 20.

The apparatus in accordance with the invention can be used in such a way that a desired running state and a desired driving load of the tire 8 are first set in a defined manner via the disc 1 and the holding apparatus 5. During this, the visco-elastic measurement device 11 is located in the position shown in FIG. 2. After a predetermined time the disc 1 and the tire 8 are stopped and the device 11 is advanced into its position shown in FIG. 3 in which the measuring head 13 with the measurement tip 18 enters into engagement with the tire 8.

Then, the visco-elastic measurement is carried out in that the evaluation and control unit 20 causes the measurement body 12 to execute oscillations of a predetermined frequency. During this, the movement of the measuring body 12 is brought about by the piezo element 16 and is detected on the one hand by the force pick-up 17 and, on the other hand, by the path measuring device 24. At the same time, the temperature of the tire 8 can be determined via the temperature measuring device 25. The measuring signals of the force pick-up 17, of the path measuring device 24 and of the temperature measuring device 25 are supplied via the measurement converters 21 to the evaluation and control unit 20. The visco-elasticity of the sample body is determined in known manner from the data obtained, in particular the real and imaginary components of the stiffness $S_H$ as a parameter related to the modulus of elasticity. In this way, the stiffness can then be determined both via the force which is measured and also via the path which is measured in dependence on the force which is introduced or better in dependence on the path of the measurement body. The quality of the measurement results can be further improved through this double determination.

The visco-elastic measurement can also be carried cyclically, that is to say, a measurement phase respectively follows a load phase. Furthermore, the measurement values which are thereby obtained can be compared with measured values at a tire which was heated in a tempering apparatus to the same temperature which the tire 8 obtained due to the driving load. A dwell time or standing time can also be introduced after each load phase or after a plurality of load phases.

What is claimed is:

1. An apparatus for measuring the properties of rubber elastic tires, in particular motor vehicle tires, in dependence on simulated driving loads and/or running states with means (1) for rotating a tire (8) to be measured at a tire contact patch and means (5) for simulating driving loads and/or running states, in particular with respect to the rotational speed, to the weight load and to the slip angle of the tire (8), characterized in that a device (9) for measuring the visco-elastic properties of the tire (8) is provided at the apparatus and is designed for direct use on the tire (8) disposed in the apparatus and further characterized in that the device (9) includes a measuring body (12) which has a measuring head (13), which can be placed onto a tire (8) and which is displaceably mounted relative to a holder (11) fastened to the apparatus, means (16) for moving the measuring body (12) to and fro and means (17, 24) for measuring the displacement path of the measuring head (13) and/or the force acting on the measuring head (13) during the moving to and fro of the measuring body (12).

2. An apparatus in accordance with claim 1, characterized in that a zero position of the measuring head (13) is fixed by a pre-determined penetration depth.

3. An apparatus in accordance with claim 2, characterized in that the penetration depth in the zero position is selected such that the deflection of an indenter of the measuring head (13) lies in a region of an at least approximately linear force/path ratio.

4. An apparatus in accordance with claim 3, characterized in that the penetration depth in the zero position amounts to approximately 100 to approximately 500 $\mu$m.

5. An apparatus in accordance with claim 1, characterized in that the measuring head (13) projects beyond the housing (11) in accordance with the penetration depth.

6. An apparatus in accordance with claim 1, characterized in that means are provided by which the measuring head (13) can be moved out of the housing (11) into a zero position of the measuring head.

7. An apparatus in accordance with claim 1, characterized in that a zero position of the measuring head (13) can be selected.

8. An apparatus in accordance with claim 1, characterized in that the deflection of an indenter of the measuring head (13) during the measurement is fixed via the deflection path.

9. An apparatus in accordance with claim 8, characterized in that the deflection path can be selected.

10. An apparatus in accordance with claim 1, characterized in that a deflection of an indenter (13) is selected to be so small that the tire (8) behaves in an approximately linear manner.

11. An apparatus in accordance with claim 10, characterized in that the deflection amounts to approximately 5 $\mu$m to approximately 25 $\mu$m.

12. An apparatus in accordance with claim 1, characterized in that the frequency of the to and fro movement of the measuring head (13) can be selected.

13. An apparatus in accordance with claim 1, characterized in that the frequency of the to and fro movement of the measuring head (13) amounts to approximately 1 Hertz to approximately 15 Hertz.

14. An apparatus in accordance with claim 1, characterized in that means (25) are provided for determining the temperature of the tire (8).

15. An apparatus in accordance with claim 1, characterized in that a piezo-element (16), in particular a so-called stack translator, is provided to move the measuring head (13).

16. An apparatus in accordance with claim 15, characterized in that the piezo-element (16) is arranged in a feedback loop with a path-measuring device (24).

17. An apparatus in accordance with claim 1, characterized in that the measuring head (13) has a tip (18) formed as an indenter in accordance with DIN 53505.

18. An apparatus for measuring the properties of rubber elastic tires. in particular motor vehicle tires, in dependence on simulated driving loads and/or running states with means (1) for rotating a tire (8) to be measured at a tire contact patch and means (5) for simulating driving loads and/or running states, in particular with respect to the rotational speed, to the weight load and to the slip angle of the tire (8), characterized in that a device (9) for measuring the viscoelastic properties of the tire (8) is provided at the apparatus and is designed for direct use on the tire (8) disposed in the apparatus further characterized in that the apparatus has a rotatable disk (1) on which a tire (8) to be measured can be rolled off and there is arranged above the disk (1) an axle shaft (4) on which a tire (8) to be measured can be put in place and which is rotatably mounted in a holding apparatus (5) by means of which the tire (8) can be pressed onto the disk (1) via the axle shaft (4) and can be changed in its orientation relative to the disk (1).

19. An apparatus for measuring the properties of rubber elastic tires, in particular motor vehicle tires, in dependence on simulated driving loads and/or running states with means (1) for rotating a tire (8) to be measured at a tire contact patch and means (5) for simulating driving loads and/or running states, in particular with respect to the rotational speed, to the weight load and to the slip angle of the tire (8), characterized in that a device (9) for measuring the viscoelastic properties of the tire (8) is provided at the apparatus and is designed for direct use on the tire (8) disposed in the apparatus and further characterized in that means are provided by which a comparison of tires (8) heated by loading with tires heated in a thermal conditioning device can be carried out.

20. An apparatus for measuring the properties of rubber elastic tires, in particular motor vehicle tires, in dependence on simulated driving loads and/or running states with means (1) for rotating a tire (8) to be measured at a tire contact patch and means (5) for simulating driving loads and/or running states, in particular with respect to the rotational speed, to the weight load and to the slip angle of the tire (8), characterized in that a device (9) for measuring the viscoelastic properties of the tire (8) is provided at the apparatus and is designed for direct use on the tire (8) disposed in the apparatus and further characterized in that means are provided by which a comparison with the slip energy which occurs in each case can be carried out.

* * * * *